(12) United States Patent
Itani et al.

(10) Patent No.: US 9,324,156 B2
(45) Date of Patent: *Apr. 26, 2016

(54) METHOD AND APPARATUS FOR SEARCHING IMAGES

(71) Applicant: Atheer, Inc., Mountain View, CA (US)

(72) Inventors: Sleiman Itani, East Palo Alto, CA (US); Allen Yang Yang, Richmond, CA (US)

(73) Assignee: ATHEER, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,703

(22) Filed: Mar. 27, 2015

(65) Prior Publication Data

US 2015/0206320 A1    Jul. 23, 2015

Related U.S. Application Data

(62) Division of application No. 13/902,643, filed on May 24, 2013, now Pat. No. 9,020,193.

(60) Provisional application No. 61/652,129, filed on May 25, 2012.

(51) Int. Cl.
*G06K 9/00* (2006.01)
*G06K 9/48* (2006.01)
(Continued)

(52) U.S. Cl.
CPC .............. *G06T 7/0085* (2013.01); *G06F 3/011* (2013.01); *G06F 3/017* (2013.01); *G06F 17/3025* (2013.01); *G06F 17/30256* (2013.01); *G06F 17/30259* (2013.01); *G06K 9/0061* (2013.01);
(Continued)

(58) Field of Classification Search
CPC .......... G06F 17/3025; G06F 17/30256; G06F 17/30259; G06F 3/011; G06F 3/017; G06F 1/163; G06K 9/00375; G06K 9/0061; G06K 9/4604; G06T 7/0085; G06T 2207/10012; G06T 2207/10016; G06T 2207/20112; G06T 2207/30196; G06T 2207/302
See application file for complete search history.

(56) References Cited

U.S. PATENT DOCUMENTS 9,020,193 B2    4/2015 Itani et al.
2002/0181776 A1* 12/2002 Ikku ...................... G06T 7/0083
                                                     382/199
2008/0234583 A1*  9/2008 Choi ........................ A61B 8/14
                                                     600/443

OTHER PUBLICATIONS

Notice of Allowance mailed Feb. 6, 2015, for U.S. Appl. No. 13/902,643 of Itani et al., filed May 24, 2013.
(Continued)

*Primary Examiner* — Amara Abdi
(74) *Attorney, Agent, or Firm* — Perkins Coie LLP

(57) ABSTRACT

Disclosed are methods and apparatuses for searching images. An image is received and a first search path is defined for the image. The first search path may be a straight line, horizontal, and/or near the bottom of the image, and/or may begin at one edge and move toward the other. A transition is defined for the image, distinguishing a feature to be found. The image is searched for the transition along the first search path. When the transition is detected, the image is searched along a second search path that follows the transition. The apparatus includes an image sensor and a processor. The sensor is adapted to obtain images. The processor is adapted to define a first search path and a transition for the image, to search for the transition along the first search path, and to search along a second search path upon detecting the transition, following the transition.

72 Claims, 10 Drawing Sheets

(51) Int. Cl.
*G06T 7/00* (2006.01)
*G06F 3/01* (2006.01)
*G06F 17/30* (2006.01)
*G06K 9/46* (2006.01)
*G06F 1/16* (2006.01)

(52) U.S. Cl.
CPC .......... *G06K 9/00375* (2013.01); *G06K 9/4604* (2013.01); *G06F 1/163* (2013.01); *G06T 2207/10012* (2013.01); *G06T 2207/10016* (2013.01); *G06T 2207/20112* (2013.01); *G06T 2207/30196* (2013.01); *G06T 2207/30241* (2013.01)

(56) References Cited

OTHER PUBLICATIONS

U.S. Appl. No. 13/902,643 of Itani et al., filed May 24, 2013.

* cited by examiner

METHOD AND APPARATUS FOR SEARCHING IMAGES

CROSS-REFERENCE TO RELATED APPLICATIONS

This application is a Divisional Application of U.S. patent application Ser. No. 13/902,643 filed May 24, 2013, which claims the benefit of U.S. Provisional Application Ser. No. 61/652,129 filed on May 25, 2012, all of which are incorporated herein in their entirety.

TECHNICAL FIELD

The disclosed technique relates to image processing. More particularly, the disclosed technique relates to searching images to detect and locate features therein.

DESCRIPTION OF RELATED ART

Image processing frequently includes evaluation to identify content therein. That is, determining whether a particular image depicts a hand, a building, an object of a certain color, a flame, etc.

However, evaluating the entire content of an image to detect a particular feature or features is inefficient. A feature that is to be identified may occupy only a relatively small fraction of the image, and represent only a small fraction of the data contained within the image. For example, if a feature occupies 5% of the field of view and data content of an image, then an evaluation that considers the entire image is in effect wasting 95% of the effort expended.

Such issues become increasingly problematic as the data present in an image increases. Thus, although increasing the number of pixels, the color bit depth, the amount of focal information, etc., may improve the chances of detection by providing a larger and/or richer pool of information for detecting a given feature, increasing the amount of data also increases the resources that must be devoted to evaluating the image, e.g. time, processor cycles, power, etc.

There is a need for an efficient method and apparatus for evaluating an image so as to detect features therein.

SUMMARY

The disclosed technique contemplates a variety of systems, apparatus, methods, and paradigms for evaluating an image for the presence of a feature or features therein.

In one embodiment of the disclosed technique, a method is provided that includes, in a processor: receiving an image, defining a first search path for the image, and defining a transition for the image. A search is conducted for the transition along the first search path. If the transition is detected, a search is conducted along a second search path, the second search path substantially following the transition.

The first search path may be substantially a straight line, and/or may be substantially horizontal. The first search path may begin at or near an edge of the image, and move away from that edge, i.e. toward the opposite edge of the image. The first search path may be at or near the bottom edge of the image.

Searching along the second search path may proceed along the transition in at least two directions. If the transition forks, the second search path may fork so that searching continues along two or more forks of the second search path.

The transition may be a color transition, a brightness transition, an edge transition, and/or a focus transition. If the method includes receiving distance data for the image, the transition may be a distance transition.

The method may include identifying one or more features in the image from the transition. The method may include defining an outline of one or more features from the transition. The method may include identifying one or more features from the shape of the feature's outline. The method may include identifying a posture of the feature from the image.

The image may be a video frame.

The method may include receiving first and second images sharing at least some subject matter. The method may include defining a first search path and a first transition for the first image, searching for the first transition along the first search path, and upon detecting the first transition searching along a second search path that substantially follows the first transition. The method may include defining a third search path and a second transition for the second image, searching for the second transition along the third search path (with the second transition corresponding with the first transition), and upon detecting the second transition searching along a fourth search path that substantially follows the second transition.

The first and second transitions may be substantially similar. The first and second images may be related as stereo images.

The method may include defining a first search path and a first transition for the image, searching for the first transition along the first search path, and upon detecting the first transition searching along a second search path that substantially follows the first transition. The method may include defining a third search path and a second transition for the image, searching for the second transition along the third search path, and upon detecting the aid second transition searching along a fourth search path that substantially follows the second transition.

The first and second transition are substantially similar. The third search path may have a direction substantially opposite the direction of the first search path.

Upon detecting the transition, searching may continue along the first search path.

The method may include receiving a plurality of sequential images, and for each of the images defining a first search path therein, searching for a transition along the first search path, and upon detecting the transition searching along a second search path, the second search path substantially following the transition. The method may include identifying at least one feature from the transition for each image. The method may include identifying a motion of the feature in the plurality of images.

Receiving the image may include capturing an image having a point a view and a field of view, the point of view being substantially similar to the point of view of a human eye, and the field of view including at least a portion of at least one of the user's hands. The image may be captured using a head mounted sensor.

The method may include dividing the image into image segments, and for each segment defining the first search path and transition for the segment, searching for the transition along the first search path, and upon detecting the transition searching along a second search path, the second search path substantially following the transition.

The step of detecting the transition may include evaluating a property for at least a portion of the transition. Evaluating the property may include characterizing a variation of the property. Evaluating the property may include determining whether the property varies substantially continuously. Evaluating the property may include determining whether a presence of discontinuities, a number of discontinuities, a frequency of discontinuities, and/or a magnitude of discontinuities for the property is within a range. Evaluating the property may include determining whether the property itself is within a range. The property may be color, brightness, edge definition, focus, and/or distance.

The method may include adjusting parameters for searching along the first search path and/or the second search path. The method may include adjusting the parameter in response to image data, the image data including data in the image, data derived from the image, and/or data associated with the image. The method may include adjusting the parameter in response to image data that substantially corresponds to at least a portion of the first and/or second search path.

In another embodiment of the disclosed technique, an apparatus is provided that includes an image sensor and a processor in communication with the image sensor. The image sensor is adapted to obtain at least one image. The processor is adapted to define a first search path for the image, to define a transition for the image, to search for the transition along the first search path, and to search along a second search path upon detecting the transition, the second search path substantially following the transition.

In another embodiment of the disclosed technique, an apparatus is provided that includes a body adapted to be worn on the head of a user. An image sensor is disposed on the body such that when the body is worn on the user's head, the image sensor has a point of view substantially similar to the point of the user's eyes. A processor is in communication with the image sensor. A display is also in communication with the processor, the display being disposed on the body such that when the body is worn on the user's head, the display is disposed so as to output to the user's eyes.

The image sensor is adapted to obtain at least one image. The processor is adapted to define a first search path for the image, and to define a transition for the image. The processor is also adapted to search for the transition along the first search path, to search along a second search path upon detecting the transition, the second search path substantially following the transition.

In another embodiment of the disclosed technique, an apparatus is provided that includes means for receiving an image, means for defining a first search path for the image, means for defining a transition for the image, means for searching for a transition along the first search path, and means for searching along a second search path upon detecting the transition, the second search path substantially following the transition.

In one embodiment of the disclosed technique, a method is provided that includes, in a processor: receiving an image, defining a first search path for the image, the first search path being substantially a straight line, substantially horizontal, and proximate the bottom edge of the image, and defining a transition for the image. The method includes searching for the transition along the first search path, and upon detecting the transition searching along a second search path, the second search path substantially following the transition. The method also includes defining an outline of at least one feature from said transition, identifying the feature from the shape of the outline, and identifying a posture of the feature from the image.

In searching along the second search path, if the transition extends in at least two directions, the search follows the transition in at least two directions. In searching along the second search path, if the transition forks, the search forks the second search path and searches along at least two forks thereof.

BRIEF DESCRIPTION OF THE SEVERAL
VIEWS OF THE DRAWINGS

Like reference numbers generally indicate corresponding elements in the figures.

DETAILED DESCRIPTION

It is noted that for purposes of explanation, images typically are described herein as digital images, referring to pixels, properties of pixels, bit depths of data, etc. However, the disclosed technique is not particularly limited in terms of the images that may be searched; more specifically, although digital images may be used with the disclosed technique, other non-digital images may also be equally suitable.

Figure 1:
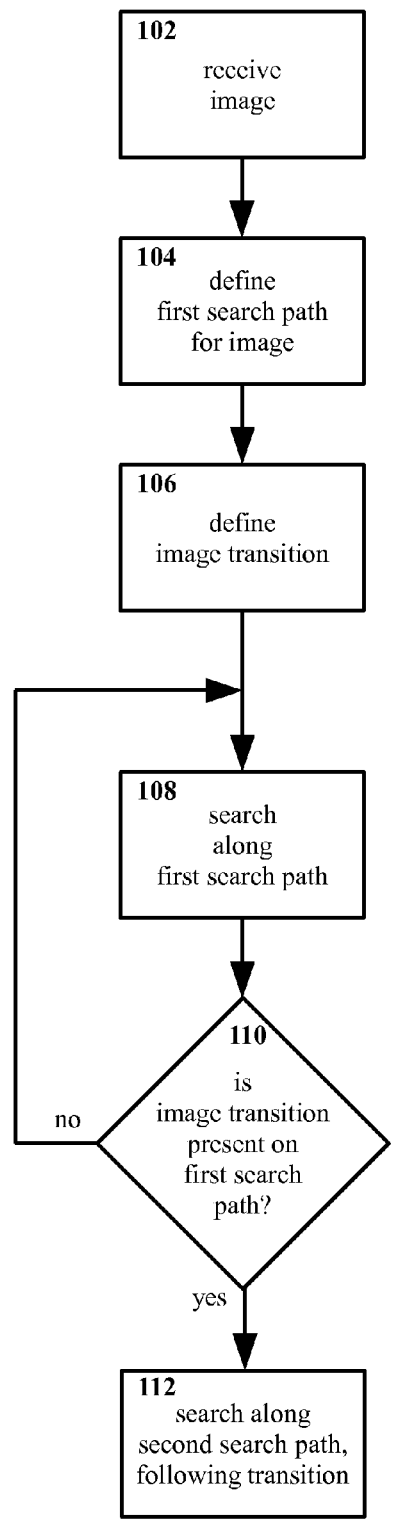
FIG. 1 shows a method for searching an image for features, according to an embodiment of the disclosed technique.

Referring to FIG. 1, an example embodiment of a method for searching an image for features is shown therein. More particularly, the example method as shown in FIG. 1 facilitates efficient detection of features within an image.

Steps as shown in FIG. 1 (and likewise in FIG. 2) typically, though not necessarily, are executed within a data processor.

In the method of FIG. 1, an image is received 102. The manner by which the image is received is not particularly limited. An image may be obtained from a sensor, transmitted through wired or wireless communication, read from stored data, etc.

A first search path is defined 104. The first search path represents a path along which a search is made for one or more image features.

It is noted that, although as shown in FIG. 1 an image is received 102 before the first search path is defined 104, this is an example only. Other arrangements, for example wherein a first search path is defined 104 before an image is received 102, may be equally suitable. Furthermore, in general for both FIG. 1 and elsewhere unless otherwise noted herein or logically precluded, the order of steps within methods according to the disclosed technique may vary. For example with regard to FIG. 1, certain steps including but not limited to steps 104 and 106 (and similar steps in other embodiments) may be reordered where logic permits and such arrangement would not violate the described function of the disclosed technique.

Typically, the first search path is relatively narrow compared to the dimensions of the image. However, the precise width of the first search path is not particularly limited, and the width may vary from one embodiment to another, or even within a single embodiment (e.g. from place to place within an image, from one image to another, from one time to another, in response to user adjustment, etc.). A narrow first search path typically would require less processing than a wide first search path, since (other factors being equal) a narrow section of an image contains less data than a wide path. However, in at least some instances, a wider search path may facilitate search approaches that are not possible or that are less effective for narrow paths. For example, for a first search path defined with a width of one pixel it would be problematic to use a search approach that averages values (e.g. for color, brightness, etc.) across the width of the first search path, since with only one pixel of width, the average value would be the value of the individual pixel. Thus, the first search path may vary in width, depending upon the particulars of the embodiment, and with consideration given to balancing factors such as speed versus reliability of feature detection, etc.

Typically, though not necessarily, the first search path is defined as at least one of a substantially straight line, beginning proximate to or substantially at an edge of the image being searched, to be substantially horizontal with respect to the content of the image, or to be proximate to substantially at the bottom edge of the image. Further explanation of these arrangements will be presented with regard to at least FIG. 3A through FIG. 3D.

Returning to FIG. 1, an image transition is defined 106. The image transition is a variation in the content of the image along the search path, defined so as to identify the presence of the feature or features to be sought. For example, a transition may be defined as a color transition, distinguishing features within the image based on color.

The disclosed technique is not particularly limited with regard to the complexity of the transition definition. The transition may be defined simply (e.g. a single numerical threshold value for color or change in color) or in a more complex fashion (e.g. color variation histogram patterns, changes therein, etc.).

In addition, the disclosed technique is not particularly limited with regard to what feature or combination of features may be used in defining a transition. Although color may for at least some embodiments be a useful factor in defining a transition, this is an example only, and the disclosed technique is not limited only to defining transitions in terms of color. Other properties and/or combinations of properties, including but not limited to brightness, edge detection, focus, and relative and/or absolute distance/depth within an image (i.e. if distance data is incorporated into the image, provided separately for the image, etc.), may also be equally suitable.

Continuing with FIG. 1, the image is searched 108. Searching follows the first search path defined in step 104, and utilizes the transition defined in step 106. That is, if a transition is defined 106 such that a particular color or color distribution distinguishes a feature being sought—for example, a human hand—from other features, objects, etc. within an image, searching might include comparison of the color of pixels and/or groups of pixels within the image along the first search path.

As the search in step 108 is being carried out, a determination is made 110 as to whether a transition is present. That is, whether the search has identified conditions such that definition of the transition (defined in step 106) is satisfied. For example, whether the color, color gradient, color histogram, etc. defining the transition has been identified along the first search path.

If the determination of step 110 is no, that is, if the transition properties defined in step 106 are not found, then the method continues with step 108. Thus, the search 108 continues at least until a transition is found to be present, or until the end of the first search path is reached (typically when the search intersects the edge of the image).

Moving on in FIG. 1, if the determination in step 110 is yes, that is, if the transition properties defined in step 106 are found to be present along the first search path, then a search is conducted along the second search path 112.

The second search path substantially follows the transition. That is, to continue the color example above, the color transition between hand-color and non-hand-color is followed, essentially tracing an outline of the feature being sought. Typically, though not necessarily, the transition is followed until the transition can no longer be detected as present, i.e. because an edge of the image has been reached, because the image content no longer exhibits the feature, etc.

As described previously, the first search path typically is predefined (i.e. in step 104), and may be relatively simple in geometry, e.g. following a straight horizontal line, etc. By contrast, it is emphasized that the second search path typically is not predefined, but rather is conditional, that is, the second search path follows a transition that may be unique to a particular image and depending on the number, shape, location, etc. of target features therein. In following the transition, the second search path thus will have a shape that depends on the content of the image. For example, the shape of the second search path may curve, fork, etc., and in general may be highly complex, although second search paths that have simple shapes, are straight lines, are horizontal, also are not excluded.

Figure 2:
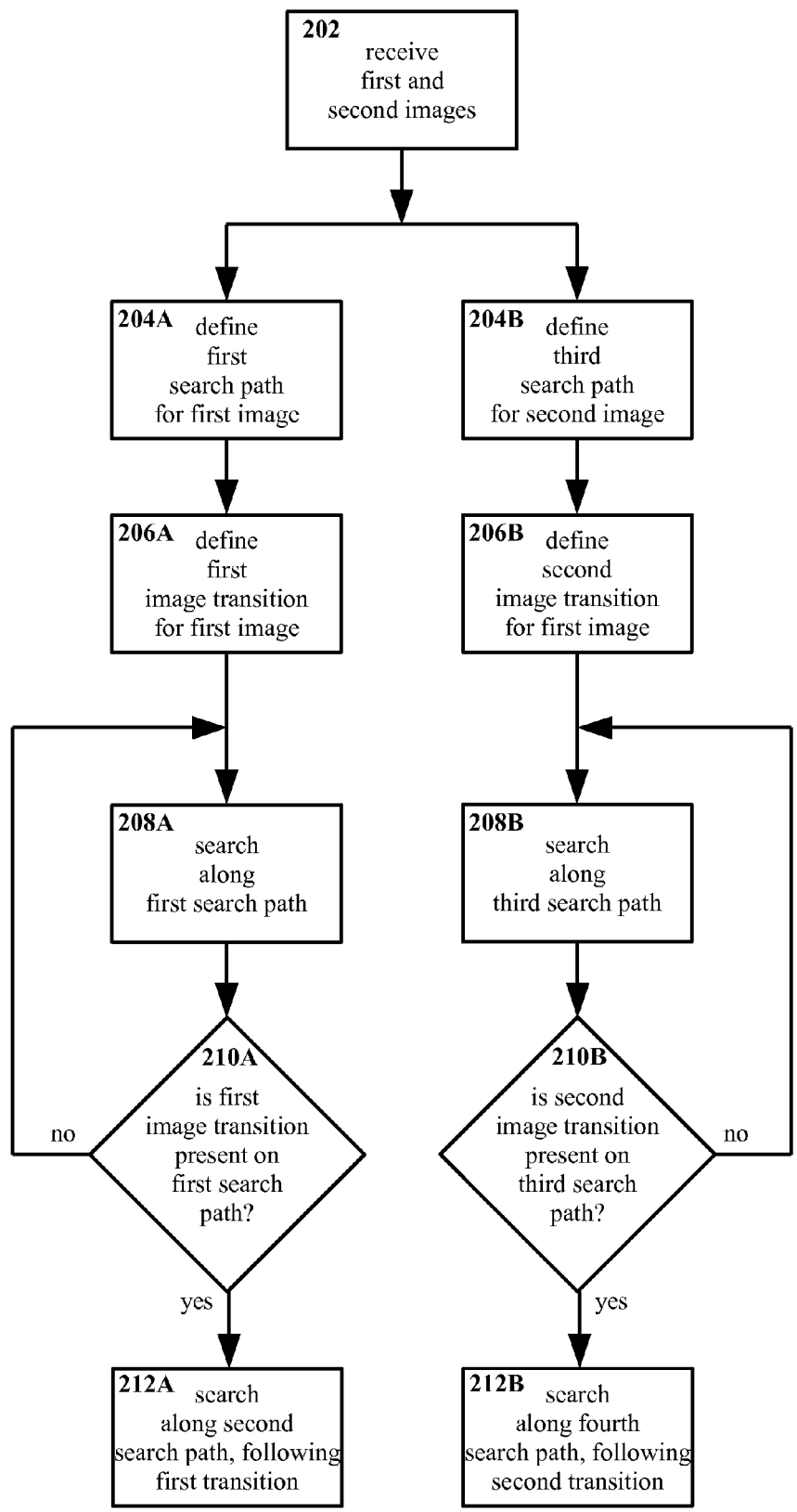
FIG. 2 shows another method for searching multiple images for features, according to an embodiment of the disclosed technique.

Turning to FIG. 2, it is noted that the disclosed technique is not limited only to following one search path at a time. Multiple defined search paths analogous to the first search path in FIG. 1, and/or multiple transition-following search paths analogous to the second search path in FIG. 1 may be followed, for the same image or for different images. Moreover, the number of transition-following search paths need not necessarily be equal to the number of defined search paths, nor is the number of either defined or transition-following search paths necessarily fixed for a given embodiment or even within a given search. Searches may be executed in succession, in parallel, or in some combination thereof.

FIG. 2 shows an example method for executing searches for two images, e.g. a stereo pair of images. However, this is an example only. As noted above the disclosed technique may utilize multiple search paths on a single image and/or multiple images not related as stereo image pairs.

It is noted that the method in FIG. 2 follows two similar but not necessarily related groups of steps, split left and right for purposes of illustration. Although the steps are shown as parallel arrangements, similar steps may or may not be performed at the same time, and/or may or may not be entirely separate from one another. For example, search functions shown as separate steps might be executed by the same processor, potentially at the same time.

For purposes of clarity, the method shown in FIG. 2 is described herein as though the left and right columns of steps are being performed sequentially, with the left column first. However, this is an example only for descriptive purposes, and does not imply that steps in the left column are necessarily performed first.

In the method shown in FIG. 2, first and second images are received 202. As noted above, the first and second images may be, but are not required to be, related as a stereo pair.

In the left column in FIG. 2, a first search path is defined 204A for the first image. The first search path represents a path along which a search is made for one or more image features, typically but not necessarily in a substantially straight and horizontal line proximate the bottom edge of the image.

A first image transition is defined 206A for the first image. The first image is searched 208A. Searching follows the first search path defined in step 204A, and utilizes the first transition defined in step 206A.

As the search in step 208A is being carried out, a determination is made 210A as to whether the first transition is present. That is, whether the search has identified conditions such that definition of the first transition (defined in step 206A) is satisfied. If the determination of step 210A is no, that is, if the first transition properties defined in step 206A are not found, then the method continues with step 208A. Thus, the search 208A continues at least until the first transition is found to be present, or until the end of the first search path is reached.

If the determination in step 210A is yes, that is, if the first transition properties defined in step 206A are found to be present along the first search path, then a search is conducted along the second search path 212A. The second search path substantially follows the first transition.

Moving to the right column in FIG. 2, a third search path is defined 204B for the second image. The third search path represents a path along which a search is made for one or more image features, typically but not necessarily in a substantially straight and horizontal line proximate the bottom edge of the image. The third search path may be analogous to, but is not necessarily identical to, the first search path defined in step 204A. Indeed, for some arrangements, for example arrangement wherein first and second images are of significantly different sizes, shapes, resolutions, etc., it may be impractical, undesirable, or even impossible for the first and third search paths to be identical. However, defining a first search path for the first image and a similar or even identical third search path for the second image also is not excluded. It is noted that for an arrangement wherein the first and third search paths are defined 204A and 204B to be identical, steps 204A and 204B may constitute only a single combined act of defining a search path for both images.

Returning to FIG. 2, a second image transition is defined 206B for the second image. The second image transition may be analogous to, but is not necessarily identical to, the first image transition defined in step 206A. Indeed, for some arrangements, for example arrangement wherein first and second image transitions are of significantly different colors, focuses, resolutions, etc., it may be impractical, undesirable, or even impossible for the first and second transitions to be identical. However, defining a first transition for the first image and a similar or even identical second transition for the second image also is not excluded. It is noted that for an arrangement wherein the first and second transitions are defined 206A and 206B to be identical, steps 206A and 206B may constitute only a single combined act of defining a transition for both images.

The second image is searched 208B. Searching follows the third search path defined in step 204B, and utilizes the second transition defined in step 206B.

As the search in step 208B is being carried out, a determination is made 210B as to whether the second transition is present. That is, whether the search has identified conditions such that definition of the second transition (defined in step 206B) is satisfied. If the determination of step 210B is no, that is, if the second transition properties defined in step 206B are not found, then the method continues with step 208B. Thus, the search 208B continues at least until the second transition is found to be present, or until the end of the third search path is reached.

If the determination in step 210B is yes, that is, if the second transition properties defined in step 206B are found to be present along the third search path, then a search is conducted along the fourth search path 212B. The fourth search path substantially follows the second transition.

While FIG. 2 refers only to two images, two defined search paths (first and third search paths), and two transition-following search paths (second and fourth search paths), it will be understood that the disclosed technique may be similarly utilized with substantially any number of images, defined search paths, and/or transition-following search paths.

Figure 3A:
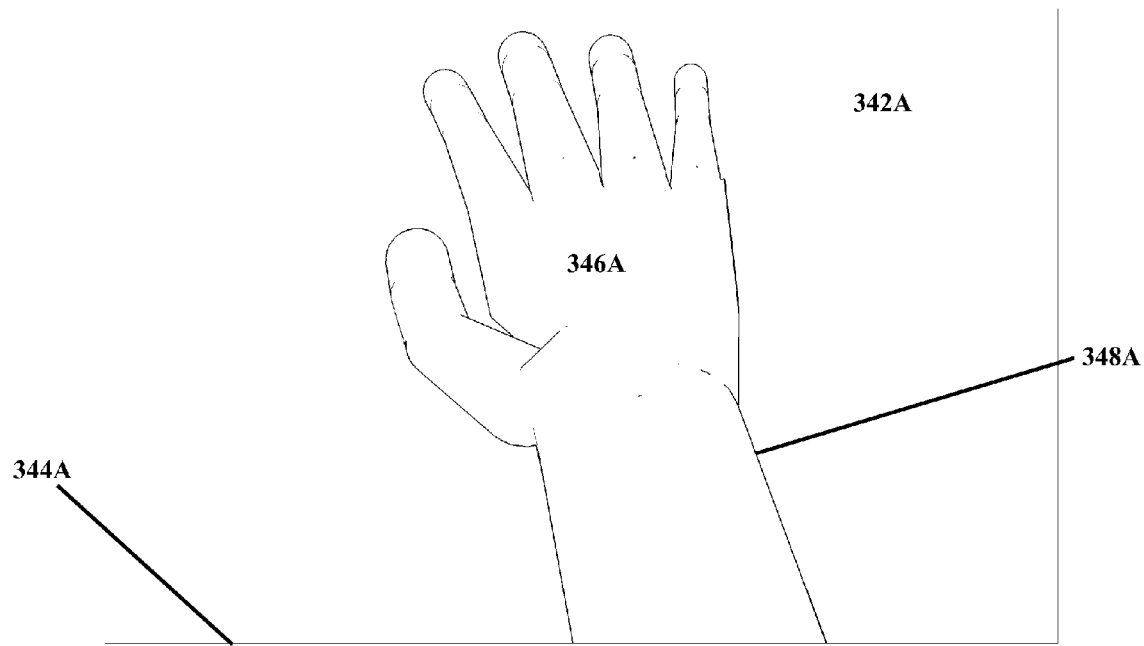
FIG. 3A through FIG. 3D show an example image with a search marked therein, according to an embodiment of the disclosed technique.

Turning to FIG. 3A through FIG. 3D, therein is shown an example image with a search according to the disclosed technique. In FIG. 3A, an image 342A is shown. The image is defined in part by a bottom edge 344A thereof. The image 342A shows therein a feature 346A, with the feature 346A being as illustrated a hand facing away with fingers slightly spread and slightly curved. However, this is an example only, and the disclosed technique is not limited only to identification of hands.

At the border between the hand 346A and the remainder of the image 342A, a transition 348A is exhibited. In practice, transitions 348A may take many forms. For purposes of illustration the transition 348A in FIG. 3A is illustrated as a simple outline for the hand 346A. However, transitions are not limited to lines or similar features. For example, a hand 346A might be distinguished from the remainder of an image 342A through color data. While other objects may have similar average color to a particular hand, the color patterns, color histogram distributions, color ranges, etc. of a hand may be distinguishable from wood, paint, tile, sand, etc. with a similar apparent color, thus color is for at least some embodiments a useful property for defining transitions that would distinguish a feature in the form of a hand from the remainder of an image in which the hand appears. However, the use of color is an example only, and other properties may be equally suitable for use in defining transitions. Suitable properties include, but are not limited to, brightness transitions, edge definition transitions, focus transitions (i.e. since objects other than a hand may be at different depths than a hand and thus may have different absolute and/or relative focus), and distance transitions (for arrangements wherein distance information is incorporated into an image, and/or is available for that image).

It is noted that a transition need not be limited to only a visible feature. For example, while color may be used to define a transition, the distinctions in color used may include properties that are not necessarily directly visible to a human viewer, such as mathematical analyses of color variation histograms. Likewise, distance is in some sense an abstraction insofar as distance itself is not visible, nevertheless distance may be used in defining a transition.

Figure 3B:
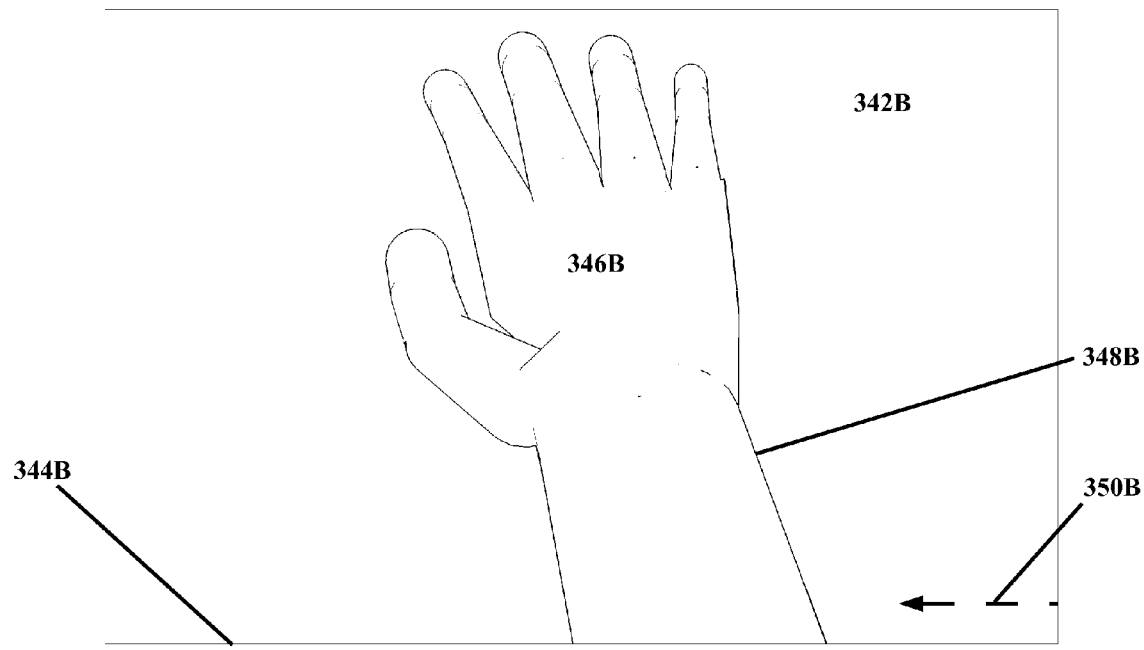

Turning to FIG. 3B, an image 342B with a bottom edge 344B is shown therein, with a feature 346B in the form of a hand present, the feature 346B exhibiting a transition 348B between the feature 346B and the remainder of the image.

In addition, FIG. 3B shows a first search path 350B. As defined for FIG. 3B, the first search path 350B is substantially horizontal, beginning at the right edge of the image 342B proximate the bottom edge 344B of the image 342B, and proceeding in a substantially straight line toward the left. This arrangement is an example only, and other arrangements for a first search path 350B may be equally suitable.

It is noted that the first search path 350B, while illustrated in FIG. 3B for clarity as a dashed line with a directional arrow, is not necessarily a visible feature in practice. While generating a visible image of the first search path 350B is not excluded, typically the first search path 350B may be defined relative to but not necessarily explicitly added to, shown on, or displayed with the image 342B.

Figure 3C:
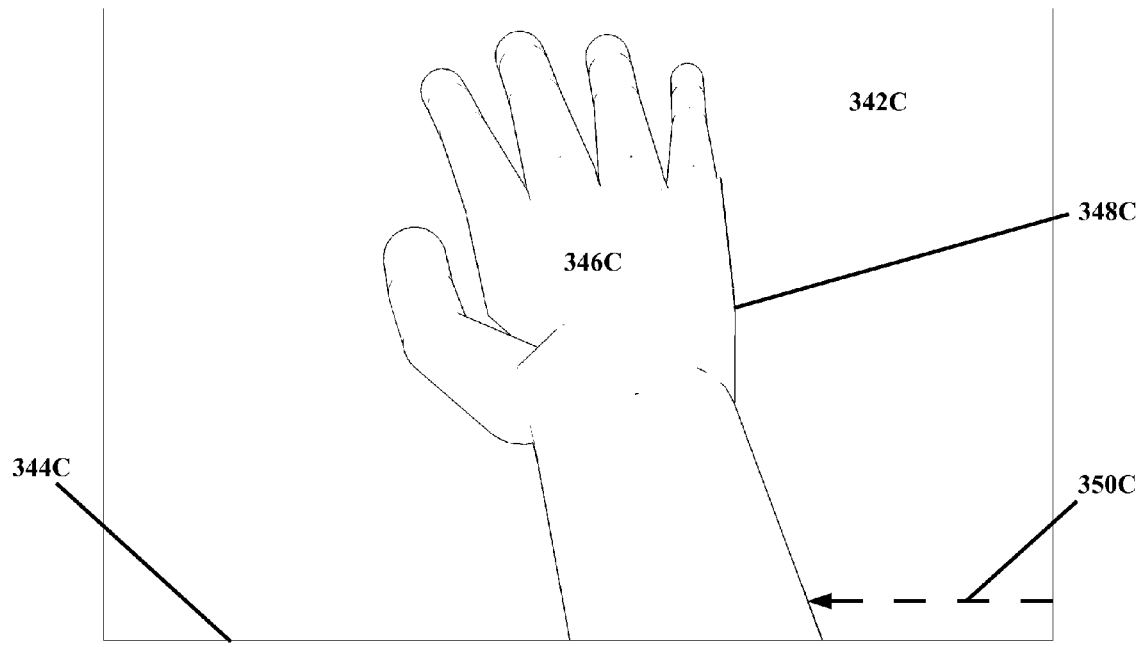

Moving to FIG. 3C, an image 342C with a bottom edge 344C is shown therein, with a feature 346C in the form of a hand present, the feature 346C exhibiting a transition 348C between the feature 346C and the remainder of the image.

A first search path 350C is also shown in FIG. 3C, similar to the search path 350B as shown in FIG. 3B. However, in FIG. 3C the first search path 350C has proceeded to a point where the first search path reaches the transition 348C. At this point, the search being conducted along the first search path 350C would detect the presence of the transition 348C.

Figure 3D:
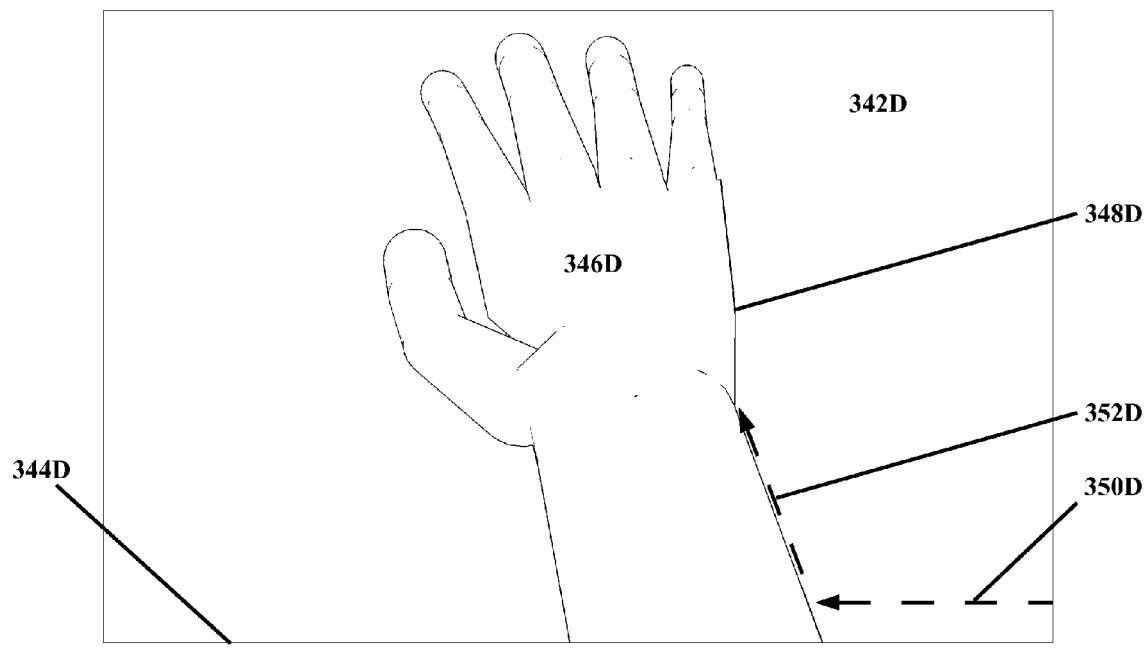

Turning to FIG. 3D, an image 342D with a bottom edge 344D is shown therein, with a feature 346D in the form of a hand present, the feature 346D exhibiting a transition 348D between the feature 346D and the remainder of the image. A first search path 350D is also shown in FIG. 3D.

As may be seen, in FIG. 3D the first search path 350D has reached the transition 348D. At this point, the search being conducted along the first search path 350D would detect the presence of the transition 348D. With the transition 348D detected, a search would follow a second search path 352D substantially along the transition. As may be seen, the second search path 352D is shown following the transition 348D in FIG. 3D.

As illustrated in FIG. 3D, the second search path 352D has only followed a portion of the transition 348D. In practice, typically the search would continue to extend the second search path 352D around the remainder of the outline of the hand 346D, following the transition 348D until and/unless the transition 348D can no longer be detected by the search, e.g. because the transition 348D reaches the edge of the image.

Certain advantages of image searching according to embodiments illustrated in FIG. 3A through FIG. 3D are discussed herein. For certain images, consideration of factors such as the positioning of features therein, the perspective and field of view of the images, etc. may reveal geometric or other image properties broadly applicable to such images. Such properties may then be used to configure a search of such images in an efficient and effective manner.

For example, in the arrangement illustrated in FIG. 3A through FIG. 3D, the feature 346A through 346D that is to be found is a human hand. In addition, the perspective and field of view of the images 342A through 342D shown in FIG. 3A through FIG. 3D is such as might be typical for an imager carried on or worn by a user, e.g. an imager configured for gesture detection on a head mounted display.

Consider for example a user executing hand gestures. Whether due to anatomical constraints and/or social practice, users typically execute hand gestures such that the arm and/or hand reaches upward to be presented in front of the torso and/or head. While it may in some cases be possible for a user to elevate his or her elbows so as to reach horizontally inward in executing gestures, or even to contort his or her arms so that a gesture presented in front of the head and/or torso extends vertically downward, these are not natural motions.

Such natural tendencies in human gesturing can be exploited when searching images for human arms and/or hands under at least some conditions. Consider now as an example a specific arrangement wherein a user wears a camera on a head mounted display, the camera having a field of view at least somewhat comparable to the field of view of a human eye (i.e. aimed generally forward and at approximately eye level). If the user executes a gesture—for example, so as to use gestural input to send input to the head mounted display—then natural gestures as described above typically will extend generally upwards within the camera's field of view, with the user's arm and/or hand entering the field of view from the bottom edge thereof.

Thus, for images taken under such conditions, if a human hand is present within the images, some portion of the user's hand and/or arm will be present along the bottom edge of the image. As a result, a search of an image along a substantially horizontal path, and proximate the bottom edge of the image, will reliably encounter the user's arm and/or hand within the image (assuming the user's hand and/or arm is present within the image at all).

Moreover, it will be understood that a horizontal search for a feature that extends substantially vertically (e.g. an arm extending into an image from the bottom edge thereof), and which may reasonably be expected to be present along the horizontal search path (in this example due to natural human behavior in executing gestures), is a relatively efficient search. Only a relatively small proportion of the image data must be considered, i.e. data along a substantially linear search path between (at most) the left and right edges of the image.

This is particularly notable when considering larger images: as the image area in pixels increases, the amount of image area that must be searched increases with the square root thereof. That is, doubling the height and width of an image measured in pixels increases the total number of pixels in the image by a factor of four, but increases the length of a substantially linear horizontal search path only by a factor of two. The search path itself increases in length, but does not necessarily increase in width (While increasing the width of the search path is not excluded, neither is an increase in the width of the search path required.).

Thus, in accordance with the disclosed technique, through consideration of the nature of images to be searched—e.g. what may be expected to appears in the image, the anticipated behavior of the image content, how the images are taken, etc.—a determination may be made as to what search path(s) might reliably and efficiently identify the image features that are of interest. More specifically with regard to the example above, through consideration of how a user's hands move when executing gestures and the point of view of an imager on a head mounted display, a determination may be made regarding initial search paths for reliable and efficient searching for the user's hands in images thereof.

The preceding describes a specific example of a manner for defining an efficient search for image features. However, more generally, the approach may be considered one of determining general properties of certain images, so as to identify therefrom simple and/or efficient approaches for executing searches of those images. That is, through consideration of the properties of (for example) images of user gestures as obtained from an imager disposed on a head mounted display, it has been discovered that hands, arms, and/or other related features within the images may be reliably and efficiently identified through searching along substantially horizontal linear search paths, including but not necessarily at or near the bottom edge of the images in question.

It is emphasized that the disclosed technique is not limited only to searches for hands and/or arms, and that other arrangements may be equally suitable. Suitable search definitions for other images may depend at least in part on the details of the images that are to be searched, and the features that are to be searched for therein.

In particular, it is noted that even for the above specific example, searching along paths that are not necessarily substantially linear, not necessarily substantially horizontal, and/or not necessarily proximate the bottom edge of the image may also be equally suitable. For example, for searching images as those described above, searching approximately midway up within the image rather than proximate the bottom edge thereof might be equally suitable if it is determined that the user's hand is reliably present at and/or beyond a region midway up the image when executing gestures.

With regard to searching within the disclosed technique, it is noted that searches are executed not necessarily for features (such as a hand) per se, but rather for transitions within an image and/or image data. Since identification and characterization of a transition within an image may result in identification of the feature exhibiting that transition as a matter of practice, and since detecting the relevant feature(s) may be the ultimate goal of performing the search, "searching for features" is in places herein treated as functionally equivalent to "searching for transitions". (Moreover, since the transition is a defined construct, and may in at least some cases be defined specifically to detect a particular feature, detecting a transition may include thereby detection of the feature.) However, even though for at least certain embodiments it may be useful to identify a feature, it is emphasized that the search itself is a search for a transition.

In more concrete terms, using an example sensing a color transition representative of a boundary between a hand and a background, a first search to detect the color transition and a second search to follow the color transition would, indeed, focus on the transition.

It is noted that this may, for at least certain embodiments, constitute an efficient approach in searching for features. That is, rather than searching for features themselves—i.e., identifying an area that represents (for example) a user's hand—the disclosed technique may search for transitions distinguishing the hand from the hand's surroundings—i.e., following an outline of the hand. This is potentially efficient since, for example, evaluating data along an outline of a region in an image (e.g. a hand) may require less total processing than evaluating data covering the area of that region. That is, the total data or total number of pixels representing an outline typically is less than the total data or pixels representing a region enclosed by that outline. For a feature of a given shape, as the area of the feature increases the area typically increases geometrically while perimeter increases arithmetically. Thus, for larger features, and similarly for increasing image resolutions, the efficiency of tracing an outline of a region (i.e. following a transition around a feature) over mapping the entire region becomes increasingly pronounced.

Figure 4:
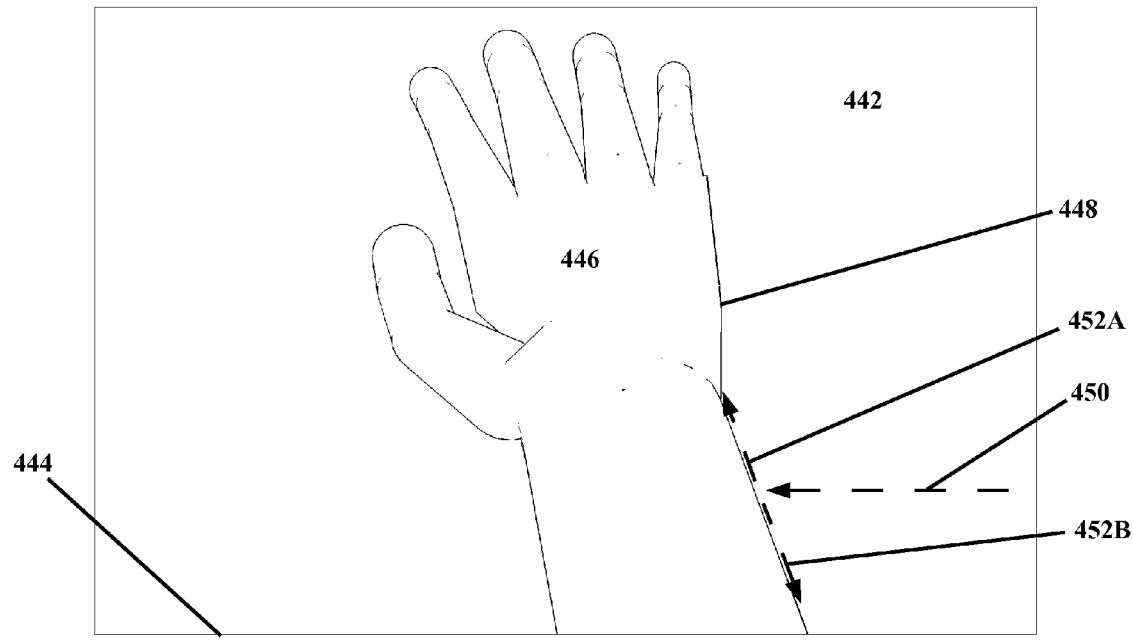
FIG. 4 shows another example image with a search marked therein, according to the disclosed technique, with the second search path proceeding in two directions.

Moving to FIG. 4, another example of a search according to the disclosed technique is shown therein. FIG. 4 shows therein an image 442 with a bottom edge 444, with a feature 446 in the form of a hand present, the feature 446 exhibiting a transition 448 between the feature 446 and the remainder of the image. A first search path 450 is also shown in FIG. 4.

As may be seen, the first search path 450 has reached the transition 448. At this point, the search being conducted along the first search path 450 would detect the presence of the transition 448. With the transition 448 detected, a search would follow a second search path substantially along the transition.

In some cases when and where a first search path 450 intersects a transition 448, there may be two or more directions in which the transition 448 may be followed. Thus, there may be two or more options for following the second search path. This is the case in FIG. 4, wherein the first search path 450 has intersected the transition 448 some distance above the bottom edge 444 of the image 442. Thus in the arrangement shown, the transition 448 extends both upward and downward from the point at which the first search path intersects 450 the transition 448.

The disclosed technique is not limited to following a second path along the transition in only one direction. Thus, when two (or more) options for a second search path following the transition 448 are available, as in FIG. 4, either or both of the possible second search paths 452A and 452B may be followed. As shown in FIG. 4, the second search path includes both an upward branch 452A and a downward branch 452B. While following multiple branches of the second search path 452A and 452B is permitted, doing so is not required, and following only one such branch may also be suitable for certain embodiments.

Figure 5:
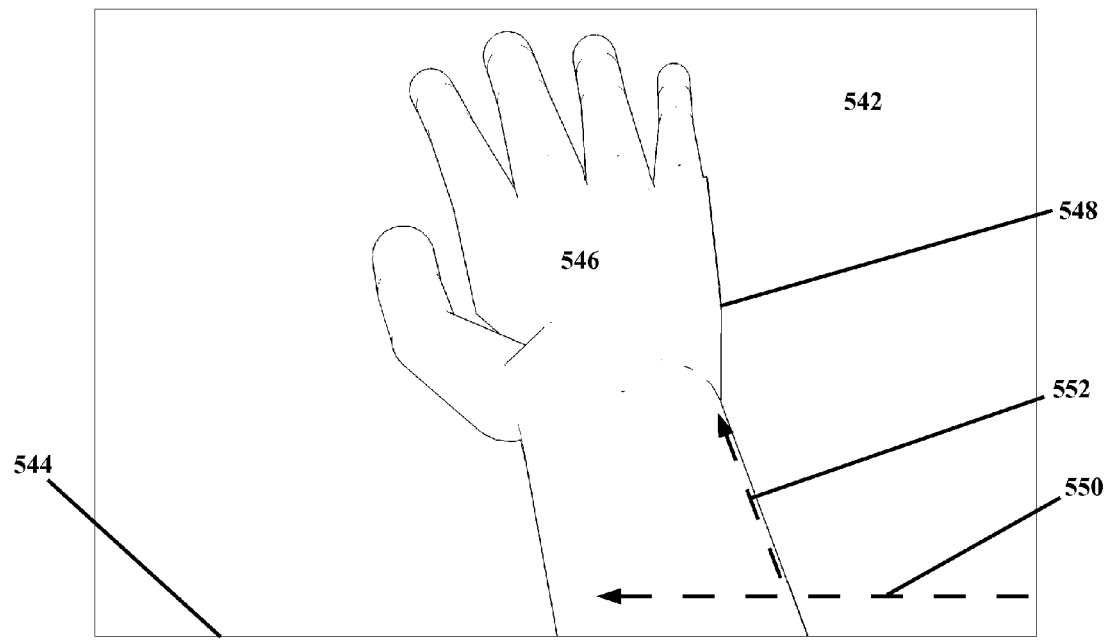
FIG. 5 shows another example image with a search marked therein, according to an embodiment of the disclosed technique, with the first search path continuing beyond the transition.

With regard to FIG. 5, another example of a search according to the disclosed technique is shown therein. FIG. 5 shows therein an image 542 with a bottom edge 544, with a feature 546 in the form of a hand present, the feature 546 exhibiting a transition 548 between the feature 546 and the remainder of the image. A first search path 550 is also shown in FIG. 5, along with a second search path 552 following the transition 548 from where the first search path 550 reached the transition 548.

As shown, the first search path 550 continues on past the point where the first search path 550 reached the transition 548. For simplicity, in some examples herein, the first search path 550 is not described beyond the point at which the first search path 550 reaches the transition 548, and the second search path 552 begins. It is permissible within the disclosed technique to terminated searching along the first search path 550 once the transition 548 is found. It is noted that for at least some embodiments it may be useful to continue searching along the first search path 550 after finding the transition 548. For example, if two or more distinct transitions were present—e.g. two hands within a single image, wherein the outline of the two hands do not intersect—terminating searching along the first search path 550 might leave one such transition undetected. However, continuing to search along the first search path 550 once the transition 548 is found, while not excluded, also is not required.

Figure 6:
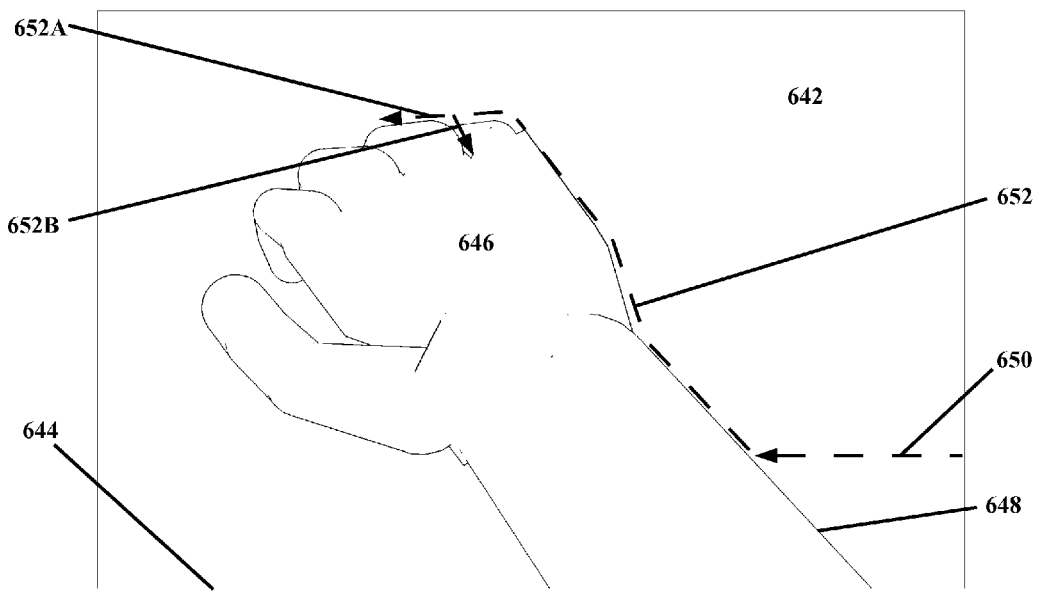
FIG. 6 shows another example image with a search marked therein, according to an embodiment of the disclosed technique, with the second search path forking.

Turning to FIG. 6, another example of a search according to the disclosed technique is shown therein. FIG. 6 shows therein an image 642 with a bottom edge 644, with a feature 646 in the form of a hand present, the feature 646 exhibiting a transition 648 between the feature 646 and the remainder of the image. A first search path 650 is also shown in FIG. 6, along with a second search path 652 following the transition 648 from where the first search path 650 reached the transition 648.

In addition, FIG. 6 shows an arrangement wherein the second search path 652 reaches a fork. That is, where previously the second search path 652 followed only a single possible direction along the transition 648, the transition 648 forks at the gap between two adjacent fingers, with one fork extending around the next finger and one fork extending between the two fingers.

In such instance, the second search path 652 may likewise fork into two or more directions 652A and 652B. It is noted that such an arrangement is somewhat similar to that shown in FIG. 4, except that in FIG. 6 the second search path 652 (and likewise the transition 648 itself) splits to follow two forks 652A and 652B after the point at which the first search path 650 reaches the transition 648.

Thus, regardless of where or when two (or more) options manifest or otherwise become available in pursuing the second search path along the transition 648, either or both of the possible second search path forks 652A and 652B may be followed. While following multiple forks of the second search path 652A and 652B is permitted, doing so is not required, and following only one such branch may also be suitable for certain embodiments.

Figure 7:
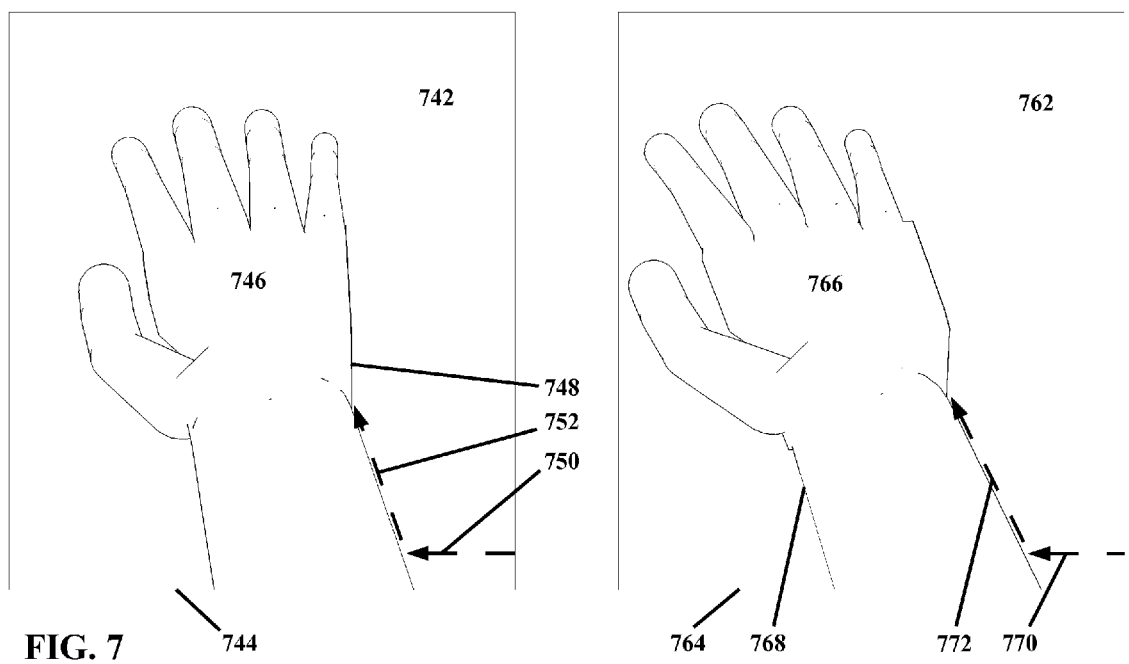
FIG. 7 shows another pair of images with multiple searches marked therein, according to an embodiment of the disclosed technique.

With regard to FIG. 7, yet another example of a search according to the disclosed technique is shown therein. FIG. 7 shows therein a first image 742 with a bottom edge 744, with a feature 746 in the form of a hand present, the feature 746 exhibiting a first transition 748 between the feature 746 and the remainder of the image 742. A first search path 750 is also shown in FIG. 7, along with a second search path 752 following the first transition 748 from where the first search path 750 reached the first transition 748.

In addition, FIG. 7 also includes therein a second image 762. The second image 762 includes a bottom edge 764, and a feature 766 also in the form of a hand, the feature 766 exhibiting a second transition 768 between the feature 766 and the remainder of the image 762. A third search path 770 is also shown in FIG. 7, along with a fourth search path 772 following the second transition 768 from where the third search path 770 reached the second transition 768.

The arrangement in FIG. 7 represents a situation somewhat similar to that presented in FIG. 2, in that two images are being searched. Typically, searching multiple images is similar to searching a single image, in that similar approaches are utilized, i.e. a search along first search path 750 within the first image 742 until a first transition 748 is detected and a search along a second search path 752 following the first transition 748, and likewise a search along a third search path 770 within the second image 762 until a second transition 768 is detected and a search along a fourth search path 772 following the second transition 768. However, this is an example only, and variations between approaches when searching multiple images are not excluded.

When searching multiple images, searching may be executed in parallel, in series, in some combination thereof, etc. As illustrated in FIG. 7, the first and second images 742 and 762 are representative of images from left and right imagers in a stereo pair, and thus parallel processing may for at least some embodiments be useful. However, the use of stereo images, and of parallel processing, is an example only, and other arrangements may be equally suitable. In particular, processing of multiple images may include, but is not limited to, processing multiple still frames extracted from and/or representative of a video.

For some embodiments, two or more images may show some or all of the same physical content, e.g. the same hand or hands, etc. Thus, for certain embodiments the feature 746 in the first image 742 may be or represent the same physical object as the feature 766 in the second image 762; likewise the first transition 748 and the second transition 768 may represent similar or identical image phenomena.

In addition, particularly but not exclusively in cases where the first and second images 742 and 762 share subject matter, the definitions for the transitions 748 and 768 may be similar or identical, and likewise the first and third search paths 750 and 770 may be similar or identical. However, such similarities are not required, and will not necessarily exist in all cases, and other arrangements may be equally suitable.

Where multiple images are processed, data acquired from multiple images may be combined for further use. For example, for the arrangement shown in FIG. 7 wherein the first and second images 742 and 762 represent a stereo image pair, following the second and fourth search paths 752 and 772 will reveal two outlines of (for example) a user's hand, from different perspectives. Such information may be used in a variety of ways, for example to determine distance to the hand through parallax measurement, to generate a model of the hand (three dimensional or otherwise) based on both outlines, etc.

Similarly, for an arrangement wherein multiple sequential images are obtained and searched according to the disclosed technique, a sequence of outlines for the hand or other feature therein may be obtained. Such sequence may for example be used to identify motions and/or changes in configuration of the hand, i.e. so as to sense moving gestures as opposed to (or in addition to) detecting static postures.

However, while searching multiple images may be useful for certain embodiments, searching multiple images is not required, nor are searches that are performed with multiple images limited only to the arrangements described. Other arrangements may be equally suitable.

Figure 8:
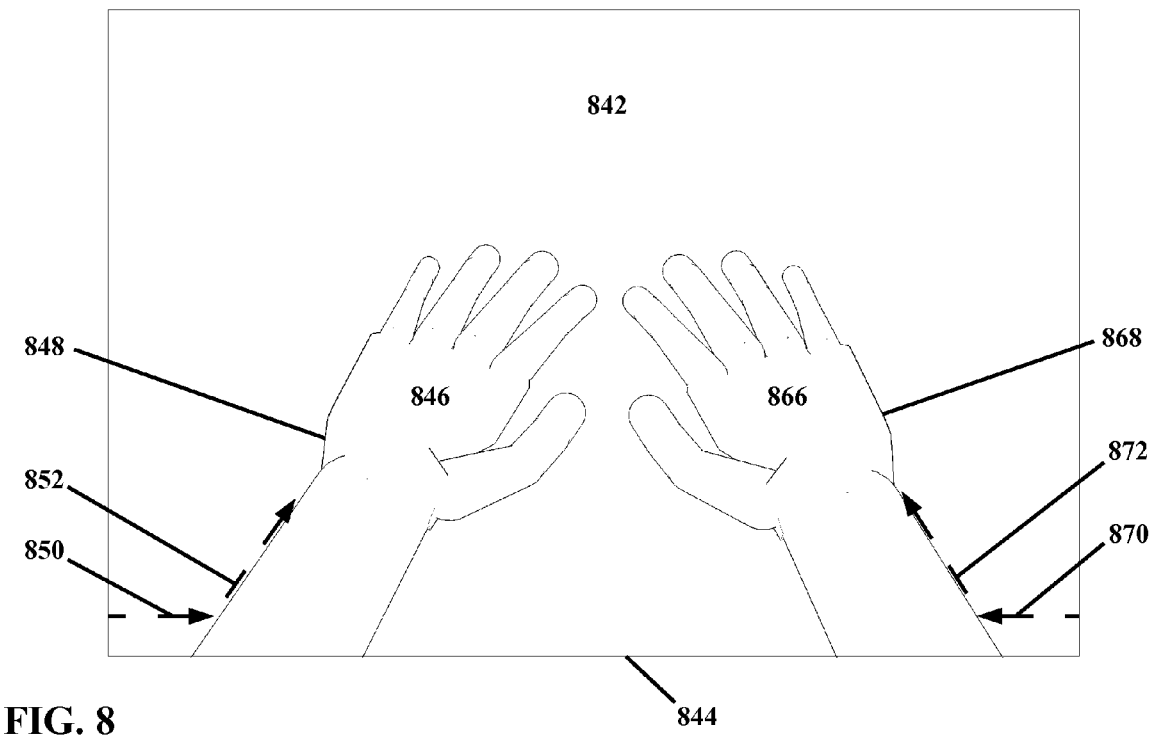
FIG. 8 shows another example image with multiple searches marked therein, according to an embodiment of the disclosed technique.

Turning to FIG. 8, another example of a search according to the disclosed technique is shown therein. FIG. 8 shows therein an image 842 with a bottom edge 844. The image has first and second features 846 and 866 therein, the first and second features 846 and 866 being in the form of left and right hands respectively. The first feature 846 exhibits a first transition 848 between the first feature 846 and the remainder of the image 842. The second feature likewise exhibits a second transition 868 between the second feature 866 and the remainder of the image 842.

A first search path 850 is shown in FIG. 8, along with a second search path 852 following the first transition 848 from where the first search path 850 reached the first transition 848. Similarly, a third search path 870 is shown in along with a fourth search path 872 following the second transition 868 from where the third search path 870 reached the second transition 868.

The arrangement in FIG. 8 represents a situation somewhat similar to that present in FIG. 2 and FIG. 7, in that two searches are conducted (one along the first and second search paths 850 and 852, and one along the third and fourth search paths 870 and 872). However, while in FIG. 2 and FIG. 7 two searches are conducted in two images, in FIG. 8 only one image is present with two searches being conducted therein.

Conducting multiple searches within a single image may be useful for at least some embodiments. For example, if the first search path 850 terminated upon reaching the first transition 848 and beginning the second search path 852, and the second search path 852 in turn terminated upon reaching the bottom edge 844 of the image 842, then only the first feature 846 (or for certain embodiments, the first transition 848) would have been identified. The second feature 866 and/or the second transition 868 would not be detected along either the first or second search path 850 or 852. As previously noted, the first search is not required to terminate upon reaching a transition, so for certain embodiments there may be other suitable arrangements for finding multiple features and/or transitions rather than multiple searches. Nevertheless, the use of multiple searches for an image may for some embodiments be useful in providing more complete searches of that image.

In addition, searching along multiple paths may for at least some embodiments enable more rapid searching. For example, if the first and third search paths 850 and 870 are searched in parallel, and/or the second and fourth search paths 852 and 872 likewise are searched in parallel, then the total time required to complete a full search of the image 842 may be less than if searching was executed in series.

Furthermore, considering an alternate arrangement (not shown) wherein the first search path 850 was vertically higher within the image 842, and/or wherein the first feature 846 with the first transition 848 was vertically lower within the image 842, then it might be possible for the first search path 850 to fail to intersect the first transition 848, while the third search path 870 might nevertheless intersect the first transition 848. That is, different searches executed along different paths, including but not limited to paths at different vertical positions within the image, may identify different transitions and/or features within the image. Thus, through use of multiple search paths an image may be more completely searched for features.

In addition, for certain embodiments it may be useful to divide an image into segments, and to search one or more such image segments individually rather than (and/or in addition to) searching the image as a whole. For example, an image might be divided geometrically into a three by three array of image segments, with searches along first and/or second search paths executed in at least one and possibly up to all nine image segments, searching being carried out substantially as described herein with regard to individual searches along first and/or second search paths. As noted previously, multiple searches may be executed within an image, and executing multiple searches within an image, whether along a first search path, a second search path, and/or otherwise, may take place in series, in parallel, or in some combination thereof. Likewise for multiple searches in image segments, searches along first and/or second search paths in image segments may take place in series, in parallel, or in some combination thereof.

However, although executing multiple searches of an image may be useful for certain embodiments of the disclosed technique, executing multiple searches of an image is not required, and other arrangements may be equally suitable.

Figure 9:
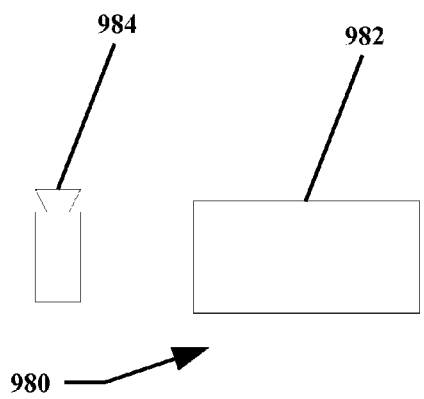
FIG. 9 shows a schematic of an example apparatus, according to an embodiment of the disclosed technique.

Moving on to FIG. 9, an embodiment of an apparatus 980 for searching an image is shown. The apparatus 980 includes a processor 982, and an image sensor 984 in communication with the processor 982. The image sensor 984 is adapted to obtain at least one image. The processor 982 is adapted to define a first search path for the image, i.e. a first path along which to search within the image. The first search path may be substantially a straight line. The processor 982 is also adapted to define a transition for the image, i.e. a transition within the image of some property or properties. The processor 982 is adapted to search for the transition along the first search path, and to search along a second search path upon detecting the transition. The second search path substantially follows the transition.

A range of general-purpose, special-purpose, and embedded systems may be suitable for use as the processor 982. Moreover, it may be equally suitable for the processor 982 to consist of two or more physical or logical processor components.

A range of devices also may be suitable for use as the image sensor 984. As illustrated in FIG. 9, the sensor 984 is a compact digital camera, adapted to capture images and/or video. A range of cameras including, but not limited to, Complementary metal-oxide-semiconductor (CMOS) and Charge-coupled device (CCD) cameras may be suitable.

The manner by which the processor 982 is in communication with the sensor 984, and (if present, see below) other components is not particularly limited. As illustrated in FIG. 9, components are shown to communicate by wire link, but other arrangements, including but not limited to wireless communication, may be equally suitable.

Likewise, the manner (or manners) for initiating and/or controlling obtaining an image, defining a first search path, defining a transition, searching for the transition along the first search path, and following the transition along the second search path, etc. is not particularly limited. For certain embodiments, it may be useful for a general operating system instantiated on the processor 982 to initiate and/or control such functions. However, the use of an operating system in such fashion is an example only, and other arrangements may be equally suitable.

In the example illustrated in FIG. 9, the processor 982 may be considered to include storage therewith suitable for storing a definition for the first search path, a definition for the transition, instructions for searching, etc. Various systems may be suitable for storing relevant data, including but not limited to separate memory chips, hard drives, etc., and memory systems integrated with the processor 982. Moreover, storage (if present) may or may not be local to the apparatus 980, i.e. storage may be on remote hardware in communication with the apparatus 980, in a "cloud" system, or otherwise physically distinct and/or distant from the processor 982 and/or other components of the apparatus 980.

Figure 10:
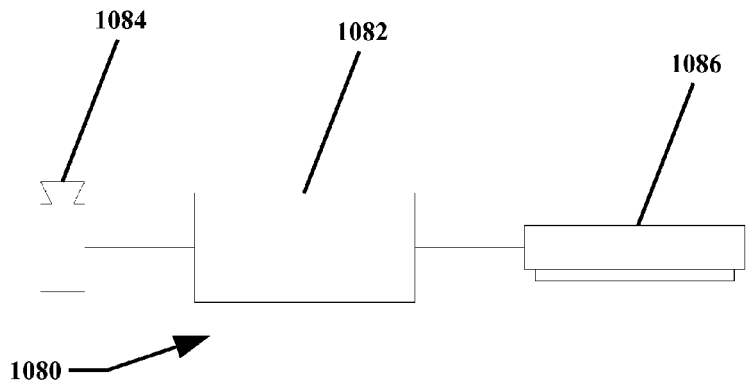
FIG. 10 shows a schematic of another example apparatus, according to an embodiment of the disclosed technique.

FIG. 10 shows another embodiment of an apparatus 1080 for interacting with an interface in accordance with the disclosed technique. The apparatus 1080 includes a processor 1082, and a sensor 1084 in communication with the processor 1082.

In addition, the apparatus may also include a display 1086 in communication with the processor 1082. The display may output the image, the first search path, the second search path, etc., and/or some combination thereof. The display 1086 may also be adapted to output additional information, e.g. text, images, etc. (which may or may not be related to the image, features, search paths, etc.).

A range of devices may be suitable for use as the display 1086, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that output images directly onto a user's eyes also may be equally suitable. Either digital or analog display technologies may be suitable.

Figure 11:
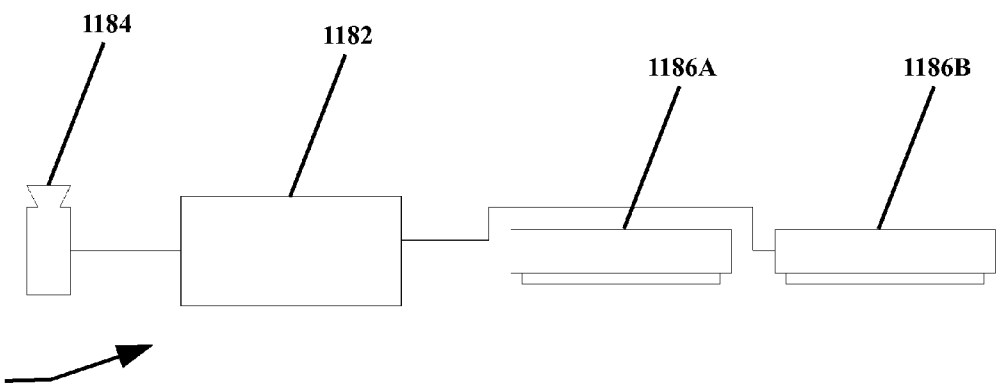
FIG. 11 shows a schematic of another example apparatus, according to an embodiment of the disclosed technique.

Embodiments of an apparatus according to the disclosed technique may include multiple instances of some or all components described herein. For example, in FIG. 11 shows an arrangement of an apparatus 1180 with multiple displays 1186A and 1186B, along with a processor 1182 and a sensor 1184. In such instance, the displays 1186A and 1186B may form a stereo system, with the first display 1186A and second display 1186B being adapted to output stereo images.

Such a display arrangement may be useful for some embodiments, as it enables the outputting of three dimensional objects, environments, interfaces, effects, etc., by outputting slightly different images to the first and second displays 1186A and 1186B, comparable to what would be seen by a user's left and right eyes if the user were looking at an entirely physical environment in three dimensional space. However, the use of a stereo display system is an example only, and other arrangements may be equally suitable.

Figure 12:
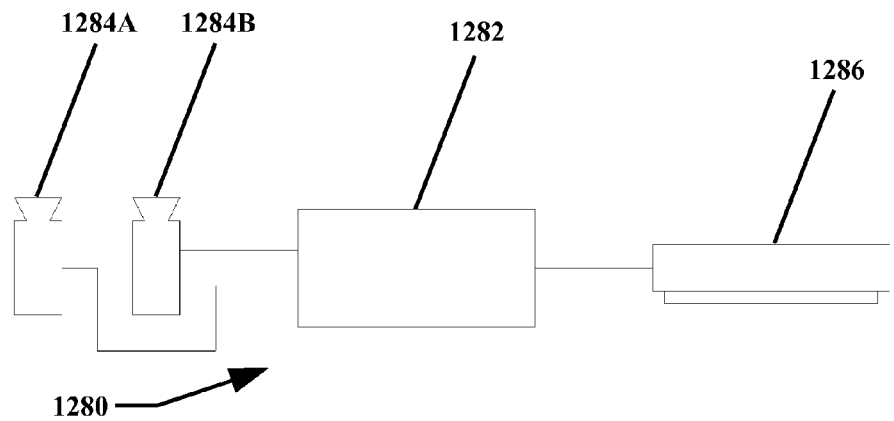
FIG. 12 shows a schematic of another example apparatus, according to an embodiment of the disclosed technique.

Referring to FIG. 12, an embodiment is shown of an apparatus 1220 with multiple sensors 1284A and 1284B, along with a processor 1282 and a display 1286. Sensors 1284A and 1284B may form a stereo system, with the first sensor 1284A and second sensor 1284B being adapted to obtain stereo images. Such a stereo arrangement may be useful for some embodiments. However, this is an example only, and other arrangements may be equally suitable.

Figure 13:
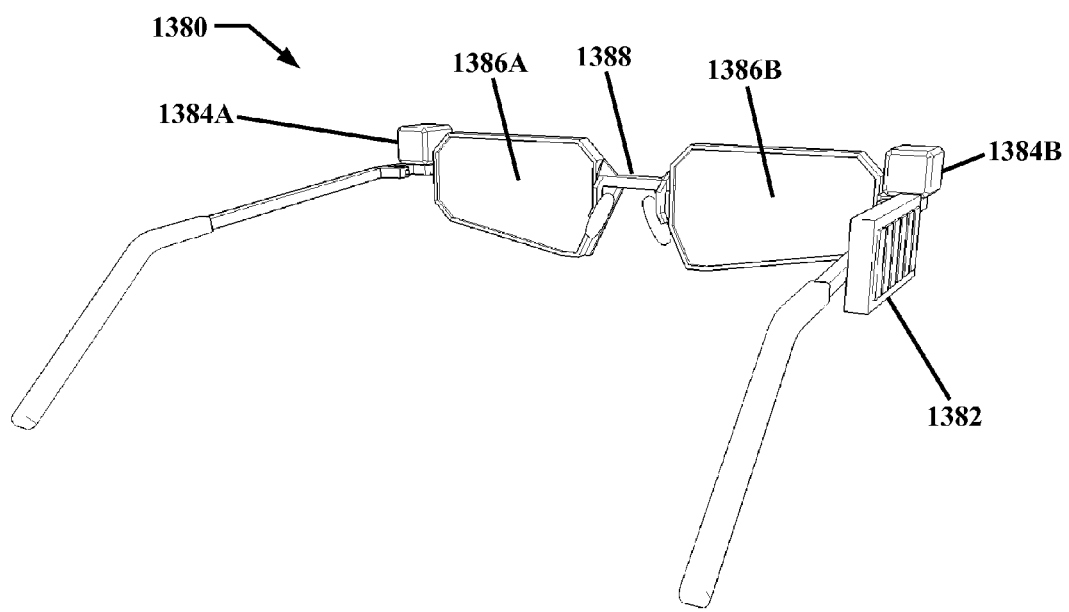
FIG. 13 shows an example head mounted display, according to an embodiment of the disclosed technique.

The disclosed technique may be incorporated into and/or utilized with a broad range of other devices. For example, FIG. 13 shows an example of an apparatus 1380 in accordance with the disclosed technique, with the apparatus 1380 therein configured as a head mounted display. However, it is emphasized that the disclosed technique is not limited only to head mounted displays or even to mobile devices more generally.

The embodiment shown in FIG. 13 includes a processor 1382, first and second sensors 1384A and 1384B in a stereo arrangement, and first and second displays 1386A and 1386B also in a stereo arrangement. In addition, the apparatus 1380 includes a body 1388 in the form of a frame for a head mounted display. As shown, the body 1388 resembles a pair of glasses, but this is an example only, and other configurations may be equally suitable.

The displays 1386A and 1386B are mounted to the body 1388, with the body 1388 being configured and the displays 1386A and 1386B being mounted such that when a user wears the apparatus 1380, the displays 1386A and 1386B are disposed proximate to and substantially aligned with the user's eyes. Likewise, the sensors 1384A and 1384B are mounted to the body 1388 such that when a user wears the apparatus 1380 the sensors 1384A and 1384B have points of view substantially similar to fields of view of the eyes of the user.

In the arrangement of FIG. 13, the processor 1382 is also mounted to the body 1380. However, such an arrangement is presented as an example only, and other arrangements may be equally suitable.

As noted previously, multiple searches may be executed within an image, and executing multiple searches within an image, whether along a first search path, a second search path, and/or otherwise, may take place in series, in parallel, or in some combination thereof.

In particular, for certain embodiments it may be useful to divide an image into segments, and search along a first search path and/or a second search path within any or all such segments. For example, an image might be divided geometrically into a three by three array of image segments, with searches along first and/or second search paths executed in at least one and possibly up to all nine image segments, searching being carried out substantially as described herein with regard to individual searches along first and/or second search paths.

As has been stated, the disclosed technique is not particularly limited with regard to what type(s) of transition(s) may be searched for and/or searched along. In addition, the disclosed technique is not particularly limited with regard to how transitions are found and/or followed. A variety of algorithms and/or approaches may be used for determining whether a transition exists (e.g. when searching along a first search path), and likewise for following a transition (e.g. when searching along a second search path).

In particular, the determination of whether a transition is found (e.g. at step 110 in FIG. 1) typically is referred to herein for simplicity as a single discrete event. However, in practice determining whether a transition has been reached may be a long and/or complex process for certain embodiments.

For example, multiple types of data may be taken into consideration for determining the presence of a single transition, i.e. both degree of focus and color. In addition, data not necessarily inherent in the image proper may be collected and/or considered, such as a depth map generated through time-of-flight using a laser or other system not directly related to the image sensor. More broadly, image data may be utilized that is present within the image (e.g. pixel color values), that is derived from the image (e.g. a histogram distribution of color pixel values), and/or that is associated with but not necessarily part of the original image (e.g. the aforementioned time-of-flight data).

Also, the determination of whether a transition is found may for some embodiments incorporate additional searching of the image and/or image data, including but not limited to searching along a potential transition—i.e. following a potential second search path for some distance—in order to determine whether a transition is indeed present.

For example, if a transition is defined in terms of color, the transition may be followed for some distance to confirm that the color parameters are met along that distance, rather than relying only on a color evaluation made at a single point.

In addition, features other than the transition itself may be considered as part of the disclosed technique, whether for detecting and/or following a transition or for other purposes (or both). For example, consider a transition defined in terms of distance, wherein the feature being sought is expected to be a foreground object so that a distance transition is expected to be exhibited by the feature. That is, the distance to a foreground object (such as a hand) typically is less than the distance to the image background, and if the foreground object overlaps the background then a significant discontinuity in distance may be expected (since the hand might for example be a distance of 0.5 meters away from the image sensor, while the background is several meters away or more)

For such an arrangement, a discontinuity in distance might be expected as the transition exhibited by the feature. Thus, the feature edge of the transition would be expected to be at a lesser distance from the image sensor than the non-feature edge of the transition, so a discontinuity in distance may be expected across the transition. However, for at least some embodiments it may also be expected that the feature-side edge of the transition may exhibit substantial continuity along the transition. This is because, for features that are substantially single objects and/or structures such as a hand, stylus, etc., the distance to different parts of the object should (in at least some instances) change in a substantially continuous fashion. This may be seen, for example, in FIG. 14.

Figure 14:
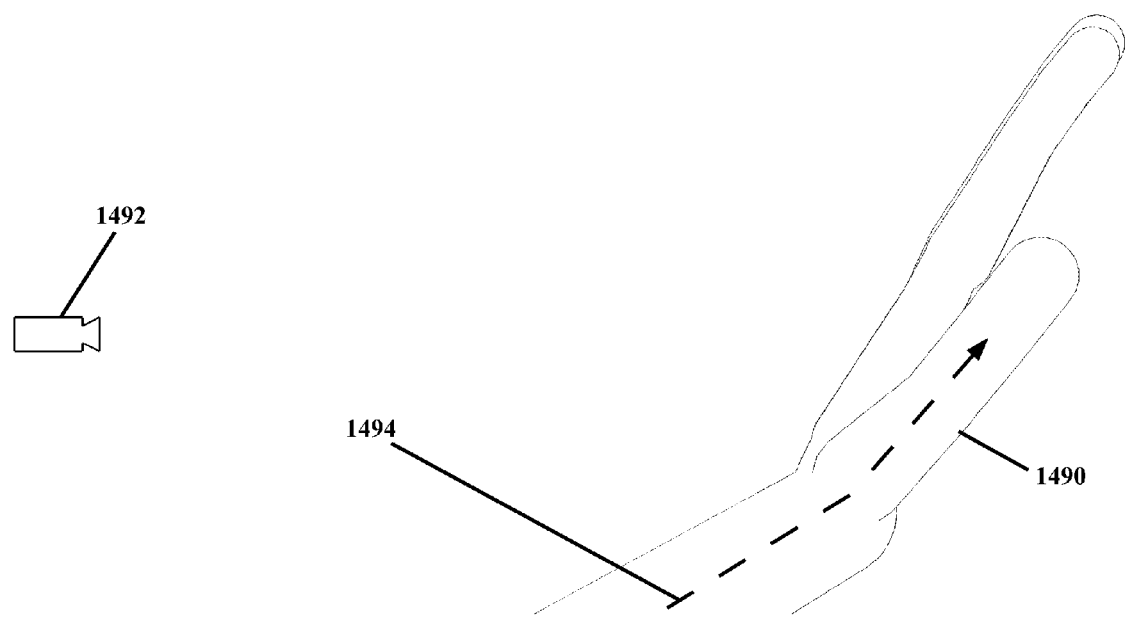
FIG. 14 shows an arrangement wherein distance between a sensor and a feature varies substantially continuously, according to an embodiment of the disclosed technique.

As shown in FIG. 14, a feature 1490 in the form of a hand is disposed in space. An image sensor 1492 also is shown, oriented such that the hand 1490 would be visible in the field of view of the sensor 1492. In addition, a contour 1494 is shown that might, for at least some embodiments, approximate a second search path around the periphery of the hand 1490 if an image obtained by the sensor 1492 were to be searched according to the disclosed technique. In such instance given the relative positions and orientations of sensor 1492 and hand 1490, the contour 1494 would represent a partial outline of the hand 1490 as seen from the sensor 1492.

It may be seen that the distance between the sensor 1492 and the contour 1494 changes in a substantially continuous manner. That is, in moving along the contour 1494 from left to right, the distance between the sensor 1492 and the contour 1494 increases substantially continuously, without discontinuities or "jumps" in distance. As noted, this may be expected for at least certain features 1490.

Small and/or occasional discontinuities in distance might be possible for certain configurations of the hand 1490, e.g. if fingers cross or overlap from the point of view of the sensor 1492. Such discontinuities may be expected to be of limited number for at least some features 1490; for example, with only five fingers on a hand, only a finite number of points would be expected to exist where fingers overlap. Such distance discontinuities may also be expected to be of limited size for at least some features 1490; a distance discontinuity between overlapping fingers of the same hand on the scale of a several centimeters might be expected, but given the size of a human hand a distance discontinuity of several tens of centimeters or several meters would not be expected.

Thus, for at least some embodiments of the disclosed technique, it may be useful to consider, for example, whether the distance from an image sensor to the feature edge of a potential transition is substantially continuous. If the feature edge of a potential transition exhibits many discontinuities, frequent discontinuities, large discontinuities, etc., it may be reasonable to conclude for at least certain features that a transition representing an edge of a sought-for feature has not been found.

The precise criteria for considering variations both across and along a transition or potential transition may vary considerably from one embodiment to another. For example, what constitutes "substantially continuous" in terms of distance along a transition may vary depending at least in part upon the nature of the feature being sought. As noted above with regard to a hand as a feature, discontinuities on the order of a few centimeters might be expected, and so might be considered to fall within a definition of "substantially continuous" for embodiments of the disclosed technique adapted for searching images for a hand.

Likewise, for at least some embodiments it may be useful to consider limits to variation in regard to the property or properties used to define the transition. For example, consider a distance transition exhibited between the periphery of a human hand. The distance between the feature edge (hand edge) of a distance transition and an image sensor would be expected to vary, since not all portions of the periphery of the hand will necessarily be at the same distance away from the image sensor. However, for at least some features such as hands, even though variation is expected the total range of variation in distance may be limited. That is, given the size of a human hand, a variation in distance of a meter might be considered unlikely (regardless of continuity, etc.), and thus a maximum level of variation might be established as a limiting parameter when searching an image for a hand.

In addition, criteria for considering variations across a transition or potential transition may vary within a single embodiment. Consider, for example, an arrangement wherein a color transition is defined and sought so as to identify a hand as a feature.

Initially, information may be limited regarding the color, color distribution, etc. of what constitutes a hand and what does not (and thus what degrees and types of color differences might be considered a transition). The color and color distribution of human hands varies widely from one person to another, for example, and may vary further if gloved hands are to be considered, etc. Likewise, the color of potential backgrounds also varies considerably from one setting to another. Thus, initially it might be useful to utilize relatively broad color parameters when searching for a transition along a first search path.

However, when a transition is positively identified, then the coloring of at least a portion of the hand (or other feature) could be observed. That is, if the hand has been found, then some group of pixels (or other image data) representing the hand have been identified. Based on such data, it may be possible to narrow or at least adjust the range of expected colors, color variations, etc. for that particular hand in a particular image. In short, once the hand has been found, the color of the hand is better known. Thus, for later searching, e.g. searching along the second search path substantially following the transition—the color parameters might be narrowed, adjusted, simplified, etc. so as to increase accuracy, reduce processing time, or otherwise improve the search. Likewise color comparison algorithms might be adjusted, etc.

Similarly, if coloring shifts along a transition, either on the feature edge (e.g. due to changing color in the hand or other feature) or the non-feature edge (e.g. due to changes in the background objects), then the color parameters, algorithms, etc. may be adjusted. Thus, the search itself may be varied along the transition, either in response to a predetermined plan or as an adaptive response to the particulars of a given image being searched.

Typically, though not necessarily, search parameters may be adjusted based on image data. That is, for purposes of adjusting search parameters it may be useful to consider data that is present within the image (e.g. pixel color values), data that is derived from the image (e.g. a histogram distribution of color pixel values), and/or data that is associated with but not necessarily part of the original image (e.g. time-of-flight distance data).

More particularly, again typically though not necessarily, search parameters may be adjusted based on image data corresponding to the first and/or second search paths, representing initial searches for transitions and searches following transitions respectively. That is, image data within search paths, near search paths, calculated from search paths, relating to search paths, etc. may be useful in adapting search criteria along search paths.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A computer-implemented method comprising: receiving, at a processor, first and second images, said first and second images sharing at least a portion of subject matter therein; defining a first search path for said first image; defining a first transition for said first image; searching for said first transition along said first search path; upon detecting said first transition, searching along a second search path, said second search path substantially following said first transition; defining a third search path for said second image; defining a second transition for said second image; searching for said second transition along said third search path, said second transition corresponding with said first transition; and upon detecting said second transition, searching along a fourth search path, said fourth search path substantially following said second transition; wherein in searching along said second search path, following said first transition in at least two directions; and in searching along said fourth search path, following said second transition in at least two directions.

2. The method of claim 1, wherein: said first and second transitions are substantially similar.

3. The method of claim 1, wherein: said first and second images are related as stereo images.

4. The method of claim 1, said first and third search paths being substantially straight lines.

5. The method of claim 1, wherein: said first search path begins proximate to an edge of said first image and moves away therefrom, and said third search path beings proximate to an edge of said second image and moves away therefrom.

6. The method of claim 1, wherein: said first and third search paths are substantially horizontal.

7. The method of claim 6, wherein: said first search path is proximate a bottom edge of said first image, and said third search path is proximate a bottom edge of said second image.

8. The method of claim 1 further comprising: in searching along said second search path, if said first transition forks, forking said second search path and searching along at least two forks thereof; and in searching along said fourth search path, if said second transition forks, forking said fourth search path and searching along at least two forks thereof.

9. The method of claim 1, wherein: each of said first and second transitions comprises at least one of a color transition, a brightness transition, an edge transition, or a focus transition.

10. The method of claim 1 further comprising: receiving distance data for said first and second images; and wherein said first and second transitions comprise distance transitions.

11. The method of claim 1 further comprising: identifying at least one first feature in said first image from said first transition, and at least one second feature in said second image from said second transition.

12. The method of claim 1 further comprising: defining a first outline of at least one first feature from said first transition, and a second outline of at least one second feature from said second transition.

13. The method of claim 12 further comprising: identifying said at least one first feature from a shape of said first outline, and said at least one second feature from a shape of said second outline.

14. The method of claim 11 further comprising: identifying a posture of said at least one first feature from said first image, and a posture of said at least one second feature from said second image.

15. The method of claim 11, wherein: said first feature and said second feature comprise a hand.

16. The method of claim 1, wherein: said first and second images comprise video frames.

17. The method of claim 1 further comprising: upon detecting said first transition, continuing to search along said first search path; and upon detecting said third transition, continuing to search along said third search path.

18. The method of claim 1 further comprising: receiving a plurality of sequential first images, and for each of said sequential first images: defining said first search path therein; searching for said first transition along said first search path; upon detecting said first transition, searching along said second search path, said second search path substantially following said first transition; receiving a plurality of sequential second images, and for each of said sequential second images: defining said third search path therein; searching for said second transition along said third search path; and upon detecting said second transition, searching along said fourth search path, said fourth search path substantially following said second transition.

19. The method of claim 18, comprising: for each of said sequential first images, identifying at least one first feature from said first transition; and for each of said sequential second images, identifying at least one second feature from said second transition.

20. The method of claim 19, comprising: identifying a first motion of said at least one first feature and a second motion of said at least one second feature.

21. The method according to claim 19, wherein: said first feature and said second feature comprise a hand.

22. The method of claim 1, wherein receiving said image comprises: capturing said first image, said first image having a first point of view and a first field of view; said first point of view being substantially similar to a point of view of a first eye of a human; said first field of view comprising at least a portion of at least a first hand of said user; capturing said second image, said second image having a second point of view and a second field of view; said second point of view being substantially similar to a point of view of a second eye of a human; said second field of view comprising at least a portion of at least a second hand of said user.

23. The method of claim 22 further comprising: capturing said first image using a first head mounted sensor; and capturing said second image using a second head mounted sensor.

24. The method of claim 1 further comprising: dividing said first image into a plurality of first image segments; for each of said first image segments: defining said first search path for said first image segment; defining said first transition for said first image segment; searching for said first transition along said first search path; upon detecting said first transition, searching along said second search path, said second search path substantially following said first transition; dividing said second image into a plurality of second image segments; for each of said second image segments: defining said third search path for said second image segment; defining said second transition for said second image segment; searching for said second transition along said third search path; and upon detecting said second transition, searching along said fourth search path, said fourth search path substantially following said second transition.

25. The method of claim 1, wherein: detecting said first transition comprises evaluating a property for at least a portion of said first transition, and detecting said second transition comprises evaluating said property for at least a portion of said second transition.

26. The method of claim 25, wherein: evaluating said property comprises characterizing a variation of said property.

27. The method of claim 25, wherein: evaluating said property comprises determining whether said property varies substantially continuously.

28. The method of claim 25, wherein: evaluating said property comprises determining whether at least one of a presence of discontinuities, a number of discontinuities; a frequency of discontinuities, or a magnitude of discontinuities for said property is within a range.

29. The method of claim 25, wherein: evaluating said property comprises determining whether said property is within a range.

30. The method of claim 25, wherein: said property comprises at least one of a color, a brightness, an edge definition, a focus, or a distance.

31. The method of claim 25 further comprising: adjusting a first parameter for searching along at least one of said first search path and said second search path; and adjusting a second parameter for searching along at least one of said third search path and said fourth search path.

32. The method of claim 31 further comprising: adjusting said first parameter in response to first image data, said first image data comprising at least one of data (a) in said first image, (b) derived from said first image, or (c) associated with said first image; adjusting said second parameter in response to second image data, said second image data comprising at least one of data (a) in said second image, (b) derived from said second image, or (c) associated with said second image.

33. The method of claim 32 further comprising: adjusting said first parameter in response to said first image data substantially corresponding to at least a portion of at least one of said first search path or said second search path; and adjusting said second parameter in response to said second image data substantially corresponding to at least a portion of at least one of said third search path or said fourth search path.

34. The method of claim 1, wherein: detecting said first transition comprises evaluating a property for at least a portion of said first transition, and detecting said second transition comprises evaluating said property for at least a portion of said second transition.

35. The method of claim 34, wherein: evaluating said property comprises characterizing a variation of said property.

36. The method of claim 34, wherein: evaluating said property comprises determining whether said property varies substantially continuously.

37. The method of claim 34, wherein: evaluating said property comprises determining whether at least one of a presence of discontinuities, a number of discontinuities; a frequency of discontinuities, or a magnitude of discontinuities for said property is within a range.

38. The method of claim 34, wherein: evaluating said property comprises determining whether said property is within a range.

39. The method of claim 34, wherein: said property comprises at least one of a color, a brightness, an edge definition, a focus, or a distance.

40. The method of claim 34 further comprising: adjusting a first parameter for searching along at least one of said first search path and said second search path; and adjusting a second parameter for searching along at least one of said third search path and said fourth search path.

41. The method of claim 40 further comprising: adjusting said first parameter in response to image first data, said image first data comprising at least one of data (a) in said image, (b) derived from said image, or (c) associated with said image; and adjusting said second parameter in response to image second data, said image second data comprising at least one of data (a) in said image, (b) derived from said image, or (c) associated with said image.

42. The method of claim 41 further comprising: adjusting said first parameter in response to said image first data substantially corresponding to at least a portion of at least one of said first search path and said second search path; and adjusting said second parameter in response to said image second data substantially corresponding to at least a portion of at least one of said third search path and said fourth search path.

43. A computer-implemented method comprising: receiving, at a processor, an image; defining a first search path for said image; defining a first transition for said image; searching for said first transition along said first search path; upon detecting said first transition, searching along a second search path, said second search path substantially following said first transition; defining a third search path for said image; defining a second transition for said image; searching for said second transition along said third search path; and upon detecting said second transition, searching along a fourth search path, said fourth search path substantially following said second transition; wherein in searching along said second search path, following said first transition in at least two directions; and in searching along said fourth search path, following said second transition in at least two directions.

44. The method of claim 43, wherein: said first and second transitions are substantially similar.

45. The method of claim 43, wherein: said first search path has a first direction; and said third search path has a second direction, said second direction being substantially opposite said first direction.

46. The method of claim 43, said first and third search paths being substantially straight lines.

47. The method of claim 43, wherein: said first search path begins proximate to a first edge of said image and moves away therefrom, and said third search path begins proximate to a second edge of said image and moves away therefrom.

48. The method of claim 43, wherein: said first and third search paths are substantially horizontal.

49. The method of claim 48, wherein: said first and third search paths are proximate a bottom edge of said image.

50. The method of claim 43 further comprising: in searching along said second search path, if said transition forks, forking said second search path and searching along at least two forks thereof.

51. The method of claim 43, wherein: each of said first and third transitions comprises at least one of a color transition, a brightness transition, an edge transition, or a focus transition.

52. The method of claim 43 further comprising: receiving distance data for said image; and wherein said first and second transitions comprise distance transitions.

53. The method of claim 43 further comprising: identifying at least one first feature in said image from said first transition, and at least one second feature in said image from said second transition.

54. The method of claim 43 further comprising: defining a first outline of at least one first feature from said first transition, and a second outline of said at least one second feature from said second transition.

55. The method of claim 54 further comprising: identifying said at least one first feature from a shape of said first outline, and said at least one second feature from a shape of said second outline.

56. The method of claim 53 further comprising: identifying a posture of said at least one first feature and a posture of said at least one second feature from said image.

57. The method of claim 53, wherein: said first feature comprises a first hand and said second feature comprises a second hand.

58. The method of claim 43, wherein: said image comprises a video frame.

59. The method of claim 43 further comprising: upon detecting said first transition, continuing to search along said first search path; and upon detecting said second transition, continuing to search along said third search path.

60. The method of claim 43 further comprising: receiving a plurality of sequential images, and for each of said sequential images: defining said first search path therein; searching for said first transition along said first search path; upon detecting said first transition, searching along said second search path, said second search path substantially following said first transition; defining said third search path therein; searching for said second transition along said third search path; upon detecting said second transition, searching along said fourth search path, said fourth search path substantially following said second transition.

61. The method of claim 60, comprising: for each of said sequential images, identifying at least one first feature from said first transition and at least one second feature from said second transition.

62. The method of claim 61, comprising: identifying a motion of said at least one first feature and a motion of said at least one second feature in said sequential images.

63. The method according to claim 61, wherein: said first feature and said second feature comprise a hand.

64. The method of claim 43, wherein receiving said image comprises: capturing an image, said image having a point of view and a field of view; said point of view being substantially similar to a point of view of an eye of a human; said field of view comprising at least a portion of at least one hand of said user.

65. The method of claim 64 further comprising: capturing said image using a head mounted sensor.

66. The method of claim 43 further comprising: dividing said image into a plurality of image segments; for each of the image segments: defining said first and third search paths for said segment; defining said first and second transitions for said segment; searching for said first transition along said first search path and said second transition along said third search path; upon detecting said first transition, searching along said second search path, said second search path substantially following said first transition; upon detecting said second transition, searching along said fourth search path, said fourth search path substantially following said second transition.

67. An apparatus, comprising: first and second image sensors; a processor in communication with said image sensors; wherein: said first image sensor is adapted to obtain at least one first image, and said second image sensor is adapted to obtain at least one second image; said processor is adapted to define a first search path for said at least one first image, and a third search path for said at least one second image; said processor is adapted to define a first transition for said at least one first image, and a second transition for said at least one second image; said processor is adapted to search for said first transition along said first search path, and said second transition along said third search path; said processor is adapted to search along a second search path upon detecting said first transition, said second search path substantially following said first transition; said processor is adapted to search along a fourth search path upon detecting said second transition, said fourth search path substantially following said second transition; wherein in searching along said second search path, following said first transition in at least two directions; and in searching along said fourth search path, following said second transition in at least two directions.

68. An apparatus, comprising: a body adapted to be worn on a head of a user; first and second image sensors disposed on said body such that when said body is worn on said head of said user, said first image sensor has a first point of view substantially similar to a point of view of a first eye of said user, and said second image sensor has a second point of view substantially similar to a point of view of a second eye of said user; a processor in communication with said image sensors; and first and second displays in communication with said processor, said displays being disposed on said body such that when said body is worn on said head of said user, said first display is disposed so as to output to said first eye of said user and said second display is disposed so as to output to said second eye of said user; wherein: said first image sensor is adapted to obtain at least one first image, and said second image sensor is adapted to obtain at least one second image; said processor is adapted to define a first search path for said at least one first image and a third search path for said at least one second image; said processor is adapted to define a first transition for said at least one first image and a second transition for said at least one second image; said processor is adapted to search for said first transition along said first search path and said second transition along said third search path; and said processor is adapted to search along a second search path upon detecting said first transition, said second search path substantially following said first transition; said processor is adapted to search along a fourth search path upon detecting said second transition, said fourth search path substantially following said second transition; wherein in searching along said second search path, following said first transition in at least two directions; and in searching along said fourth search path, following said second transition in at least two directions.

69. An apparatus, comprising: means for receiving first and second images; means for defining a first search path for said first image and a third search path for said second image; means for defining a first transition for said first image and a second transition for said second image; means for searching for a first transition along said first search path and a second transition along said third search path; means for searching along a second search path upon detecting said first transition, said second search path substantially following said first transition; and means for searching along a fourth search path upon detecting said second transition, said fourth search path substantially following said second transition; wherein in searching along said second search path, following said first transition in at least two directions; and in searching along said fourth search path, following said second transition in at least two directions.

70. An apparatus, comprising: an image sensor; a processor in communication with said image sensor; wherein: said image sensor is adapted to obtain at least one image; said processor is adapted to define a first search path and a third search path for said at least one image; said processor is adapted to define a first transition and a second transition for said at least one image; said processor is adapted to search for said first transition along said first search path and for said second transition along said third search path; said processor is adapted to search along a second search path upon detecting said first transition, said second search path substantially following said first transition; and said processor is adapted to search along a fourth search path upon detecting said second transition, said fourth search path substantially following said second transition; wherein in searching along said second search path, following said first transition in at least two directions; and in searching along said fourth search path, following said second transition in at least two directions.

71. An apparatus, comprising: a body adapted to be worn on a head of a user; an image sensor disposed on said body such that when said body is worn on said head of said user, said image sensor has a point of view substantially similar to a point of view of an eye of said user; a processor in communication with said image sensor; and a display in communication with said processor, said display being disposed on said body such that when said body is worn on said head of said user, said display is disposed so as to output to said eye of said user; wherein: said image sensor is adapted to obtain at least one image; said processor is adapted to define a first search path and a third search path for said at least one image; said processor is adapted to define a first transition and a second transition for said at least one image; said processor is adapted to search for said first transition along said first search path and for said second transition along said third search path; said processor is adapted to search along a second search path upon detecting said first transition, said second search path substantially following said first transition; and said processor is adapted to search along a fourth search path upon detecting said second transition, said fourth search path substantially following said second transition; wherein in searching along said second search path, following said first transition in at least two directions; and in searching along said fourth search path, following said second transition in at least two directions.

72. An apparatus, comprising: means for receiving an image; means for defining first and third search paths for said image; means for defining first and second transitions for said image; means for searching for said first transition along said first search path and for said second transition along said third search path; means for searching along a second search path upon detecting said first transition, said second search path substantially following said first transition means for searching along a fourth search path upon detecting said second transition, said fourth search path substantially following said second transition; wherein in searching along said second search path, following said first transition in at least two directions; and in searching along said fourth search path, following said second transition in at least two directions.

* * * * *